United States Patent
Dietrich et al.

(10) Patent No.: US 6,261,981 B1
(45) Date of Patent: Jul. 17, 2001

(54) FIBRE-REINFORCED COMPOSITE CERAMICS AND METHOD OF PRODUCING THE SAME

(75) Inventors: Gerd Dietrich, Burgrieden; Tilmann Haug, Uhldingen-Mühlhofen; Andreas Kienzle, Stuttgart; Christian Schwarz, Erlangen; Heike Stöver, Dresden; Karl Weisskopf, Bonn; Rainer Gadow, Aschau am Inn, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/381,465

(22) PCT Filed: Feb. 24, 1998

(86) PCT No.: PCT/EP98/01044

§ 371 Date: Mar. 28, 2000

§ 102(e) Date: Mar. 28, 2000

(87) PCT Pub. No.: WO98/42635

PCT Pub. Date: Oct. 1, 1998

(30) Foreign Application Priority Data

Mar. 21, 1997 (DE) ............................................. 197 11 829

(51) Int. Cl.⁷ ......................... C04B 35/589; C04B 35/80
(52) U.S. Cl. ........................ 501/95.2; 501/96.2; 501/88; 501/90; 264/658; 264/659
(58) Field of Search ................................. 501/95.1, 95.2, 501/96.2, 88, 90; 264/658, 659

(56) References Cited

U.S. PATENT DOCUMENTS

| | | | |
|---|---|---|---|
| 4,747,873 | * 5/1988 | Kamioka | 75/229 |
| 5,015,540 | * 5/1991 | Borom et al. | 428/698 |
| 5,955,391 | * 9/1999 | Kameda et al. | 501/88 |
| 6,024,898 | * 2/2000 | Steibel et al. | 264/29.1 |
| 6,042,935 | * 3/2000 | Krenkel et al. | 428/307.7 |
| 6,086,814 | * 7/2000 | Krenkel et al. | 264/610 |

FOREIGN PATENT DOCUMENTS

| | | |
|---|---|---|
| 39 33 039 | 4/1991 | (DE) . |
| 0541 971A | 5/1993 | (DE) . |
| 44 38 456A | 5/1996 | (DE) . |
| 0 249 927 | 12/1987 | (EP) . |

\* cited by examiner

*Primary Examiner*—Karl Group
(74) *Attorney, Agent, or Firm*—Crowell & Moring, L.L.P.

(57) ABSTRACT

The invention provides a fiber-reinforced composite ceramic containing high-temperature-resistant fibers, in particular fibres based on Si/C/B/N, which are reaction-bonded to a matrix based on Si, which is produced by impregnating fiber bundles of Si/C/B/N fibers with a binder suitable for pyrolysis and solidifying the binder, if desired subsequently conditioning the fiber bundles with an antisilicization layer suitable for pyrolysis, for example phenolic resin or polycarbosilane, subsequently preparing a mixture of fiber bundles, fillers such as SiC and carbon in the form of graphite or carbon black and binders, pressing the mixture to produce a green body and subsequently pyrolysing the latter under reduced pressure or protective gas to produce a porous shaped body which is then infiltrated, preferably under reduced pressure, with a silicon melt. This makes it possible to produce, in an efficient manner suitable for mass production, fiber-reinforced composite ceramics which have significantly improved properties compared with conventional composite ceramics and, in particular, are suitable for use in high-performance brake systems (FIG. 1).

37 Claims, 2 Drawing Sheets

FIBRE-REINFORCED COMPOSITE CERAMICS AND METHOD OF PRODUCING THE SAME

BACKGROUND OF THE INVENTION

The invention relates to a fibre-reinforced composite ceramic containing high-temperature-resistant fibres based on Si/C/B/N which are reaction-bonded to a matrix based on Si.

Such a process and such a composite ceramic are known from DE-A-4 438 455.

Carbon fibre-reinforced carbon (C—C, also known as CFRC or in German language usage as CFC) is among the composite ceramic materials which have been introduced successfully some time ago.

Recently developed high-performance brake systems based on CFRC brake discs with specially developed friction linings, as are used, for instance, in car racing, can, however, only be produced using numerous impregnation or carbonization and graphitization cycles, so that the production process is an extremely time-consuming, energy-intensive and costly process which may take a number of weeks or months. Furthermore, CFRC brake discs for use in production vehicles operated under normal conditions have totally unsatisfactory braking properties in the presence of moisture and when operated at low temperatures. This shows up, inter alia, in decidedly non-constant coefficients of friction as a function of the operating temperature and the surface lining which makes regulation, as hitherto customary in 4-channel ABS systems, extraordinarily difficult or even impossible. In view of this background, attempts are being made to develop improved fibre-reinforced composite ceramic materials which, for example, can be used as brake discs for high-performance brake systems in motor vehicles or railway vehicles. In addition, such fibre-reinforced composite ceramic materials are also of interest for numerous other applications, for instance as turbine materials or as materials for sliding bearings.

Although silicon-infiltrated reaction-bonded silicon carbide (SiSiC) containing from 2 to 15% by mass of free silicon has been known since the 1960s and has also been introduced commercially for some applications in the field of heat engineering, the production of SiSiC materials is also very complicated and expensive.

The abovementioned DE-A-4 438 455 discloses a process for producing a fibre-reinforced C-SiC composite ceramic in which the green body is made up of resin-impregnated fabrics. A disadvantage of this process is that the building-up or production of complicated structures from such precursors, which themselves are not exactly cheap, is very cumbersome and results in a great deal of scrap. The known process is therefore not suitable for use in mass production of components such as brake discs. The laminated structure additionally leads to strong anisotropy of various properties of the body produced in this way, which has an adverse effect on, in particular, heat removal from the brake disc. Furthermore, such brake discs have a tendency to delaminate under some conditions as they wear, which is particularly dangerous.

SUMMARY OF THE INVENTION

It is therefore an object of the invention to provide an improved fibre-reinforced composite ceramic containing high-temperature-resistant fibres and a process for producing such a composite, which makes possible simple and inexpensive production of mass-produced components such as brake discs and enables improved properties to be achieved.

This object is achieved according to the invention by a process for producing a fibre-reinforced composite ceramic containing high-temperature-resistant fibres, in particular fibres based on Si/C/B/N, which are reaction-bonded to a matrix based on Si, comprising the steps:

impregnation of fibre bundles, in particular of Si/C/B/N fibres, with a binder suitable for pyrolysis and solidification of the binder;

preparation of a mixture of fibre bundles, fillers and binders;

pressing of the mixture to produce a green body;

pyrolysis of the green body under reduced pressure or protective gas to produce a porous shaped body;

infiltration of the shaped body with a silicon melt.

The object is also achieved by a fibre-reinforced composite ceramic containing high-temperature-resistant fibres, in particular fibres based on Si/C/B/N, which are reaction-bonded to a matrix based on Si, wherein randomly distributed short fibre bundles comprising bundled individual fibre filaments with substantial retention of the individual filaments are embedded in the matrix and the short fibre bundles are surrounded, at least in the region of their surface, by a coating of carbon which has reacted completely or partially with the metallic or semimetallic matrix material.

According to the invention, it was recognized that the use of short fibre bundles for reinforcing the composite material results in considerably simplified fibre production, since it is possible to premix the various individual components and press them to form green bodies which subsequently only have to be pyrolysed and then melt-infiltrated. This makes possible a considerably simplified production process which is suitable for mass production.

It was also recognized that the favourable properties such as pseudoductile behaviour which can in principle be obtained by the fibre reinforcement can actually be achieved in production by means of silicon melt infiltration only if fibre bundles which are held together by suitable binders and are protected against attack by the silicon melt are used for fibre reinforcement. According to the invention, this is achieved by the impregnation of fibre bundles with a binder suitable for pyrolysis and subsequent solidification of the binder. This impregnation step ensures that the individual fibres in the fibre bundle hold together reliably and ensures that the fibre bundles have sufficient mechanical stability to largely prevent mechanical damage to the sensitive individual filaments during later mixing with the other constituents for producing the green body.

In the finished composite ceramic, the protection of the fibre bundles against attack by the silicon melt is shown by the fibre bundles being surrounded, at least in the region of their surface, by a coating of carbon which has reacted completely or partially with the matrix material (i.e. with silicon or with silicon compounds).

Overall, it is therefore possible to produce, in a relatively simple and inexpensive manner, a fibre-reinforced composite ceramic which has significantly improved properties compared with conventional composite ceramics and, in particular, is also suitable for use as brake body or brake disc in high-performance brake systems for production motor vehicles or railway vehicles.

For the purposes of the present invention, the term "silicon melt" encompasses not only pure silicon melts but also industrial silicon melts which contain the usual impurities or possibly additions of alloying elements.

For the fibre reinforcement, preference is given to using C fibres or, if desired, SiC fibres, although the use of other high-temperature-resistant fibres based on Si/C/B/N, some of which are just being developed, is also possible in principle and, depending on the properties of the fibres used, may even lead to further advantages. For particularly inexpensive products, aluminium oxide fibres are also conceivable.

In a preferred embodiment of the invention, the fibre bundles are produced by bundling together individual filaments with addition of a size.

The bundling together by means of a size is generally carried out by the manufacturer of the fibre bundles immediately after the production of the individual filaments by means of spinnerets. Subsequently, the fibre bundles are usually chopped to the desired length straight away.

In a further preferred embodiment of the invention, the fibre bundles are, after impregnation and solidification of the binder, additionally conditioned with an antisilicization layer suitable for pyrolysis.

This additional coating of the fibre bundles with a protective layer suitable for pyrolysis achieves an advantageous additional sheathing of the fibre bundles on their outer boundary, which firstly reduces the danger of mechanical damage to the fibre bundles during the mixing and pressing process for producing the green body and secondly ensures substantial retention of the individual filaments even in the finished end product. The chemical attack by the liquid silicon melt, which when using C fibres leads to reaction to form SiC, is largely prevented by the protective layer of carbon or possibly ceramic formed during pyrolysis, so that at most a few individual filaments in the outer regions of the fibre bundles still react with silicon to form silicon carbide.

In a further preferred embodiment of the invention, the fibre bundles are conditioned with a carbon-rich polymer material which forms solid carbon on pyrolysis, preferably impregnated with a resin or resin mixture selected from the group consisting of phenolic resins. This produces a highly effective antisilicization layer.

In a further embodiment of the invention, the impregnation is carried out using a diluted or dissolved binder, preferably in a mixing or stirring apparatus, in such a way that evaporation or drying forms fibre rods which do not clump together, but the bond between the fibres in the individual fibre bundles is retained.

This measure has the advantage that the fibre bundles can be processed in a simple manner to produce fibre rods which do not clump together, so that they remain free-flowing, which is advantageous for the later mixing process and is of considerable industrial importance.

In a further advantageous embodiment of the invention, the impregnation is carried out using a material which forms solid carbon on pyrolysis, preferably pitch or a thermoplastic.

In particular, the combination of this impregnation with subsequent conditioning using a resin or the like results in a further improved damage tolerance of the composite ceramic. However, initial impregnation with, for instance, a resin and subsequent conditioning with a pitch is also possible in principle.

According to a further embodiment of the invention, a material which forms silicon carbide on pyrolysis, preferably selected from the group of organosilicon polymers, in particular polycarbosilane, is used as antisilicization layer.

This enables effective protection of the fibre bundles against attack by the silicon melt during infiltration to be achieved, since SiC formed during the pyrolysis prevents further reaction of the fibres with silicon.

According to a further variant of the invention, a material based on Si-B-C-N which ceramicizes on pyrolysis, preferably selected from the group consisting of organosilicon-boron polymers, in particular polyborosilazanes, is used as antisilicization layer, which likewise enables improved protection against chemical attack by the silicon melt to be achieved.

In an additional embodiment of the invention, use is made of fibre bundles comprising from 1000 to 14,000 individual fibres having mean diameters of from about 5 to 10 $\mu$m and have a length of from about 1 to 30 mm, preferably from about 3 to 16 mm.

In this way, it is possible to use commercially available rovings (e.g. 12K bundles), which makes inexpensive production easier.

In an advantageous embodiment of the invention, from about 20 to 50% by volume, preferably from about 30 to 40% by volume of fibre bundles are used for preparing the mixture.

It has been found that such a volume ratio enables substantial optimization of the mechanical and thermal properties to be achieved.

In a further advantageous embodiment of the invention, carbon-containing fillers, preferably carbon black or graphite, are added to the mixture for producing the green body.

Such fillers aid the coherence in the production and subsequent pyrolysis of the green body, accelerate the pyrolysis and reduce volume changes in the component during pyrolysis.

In a further advantageous embodiment of the invention, fillers in the form of silicon or of carbides, nitrides or borides of refractory metals, preferably silicon carbide, titanium carbide or titanium boride, are mixed in powder form into the mixture for producing the green body or the materials used for impregnation or conditioning of the fibre bundles.

The addition of such hard fillers improves the wear resistance of the composite ceramic.

The mixture of the individual components is prepared in a kneader or mixer with addition of thermally curable binders, subsequently pressed in a mould and cured to form a green body.

The green body can, before or after pyrolysis, be machined to a desired shape before the infiltration with a silicon melt is carried out.

In this way, the effort expended for machining can be significantly reduced, since the green bodies have only a low abrasion resistance and can thus be machined with little effort even after pyrolysis.

In a further advantageous embodiment of the invention, the mixture is adjusted by selection of the component materials and their proportions so that the shaped body formed on pyrolysis of the green body has a porosity of from about 20 to 50%.

Since the porosity can easily be influenced by selection of the additives and their amounts, it is thus possible to set an optimum volume ratio of the melt-infiltrated metal to the other components of the composite material, namely the fibre bundles, the fillers and C precursors, in order to achieve optimized mechanical and thermal properties.

In a further preferred embodiment of the invention, binders which have favourable pyrolysis kinetics, for instance polyvinyl alcohol (PVA) or methylcellulose, are preferably added in place of thermoplastics or thermosets to the mixture, which makes a combination of pyrolysis and silicization easier.

An acceleration of the pyrolysis step thus enables this step to be combined with the melt infiltration, which significantly improves the economics.

It will be self-evident to those skilled in the art that the abovementioned features and the features still to be explained below can be embodied not only in the combination indicated in each case, but also in other combinations or alone, without going outside the scope of the present invention.

Further features and advantages of the invention can be seen from the following description of preferred illustrative embodiments with reference to the drawing.

DETAILED DESCRIPTION OF THE INVENTION

Figure 1:
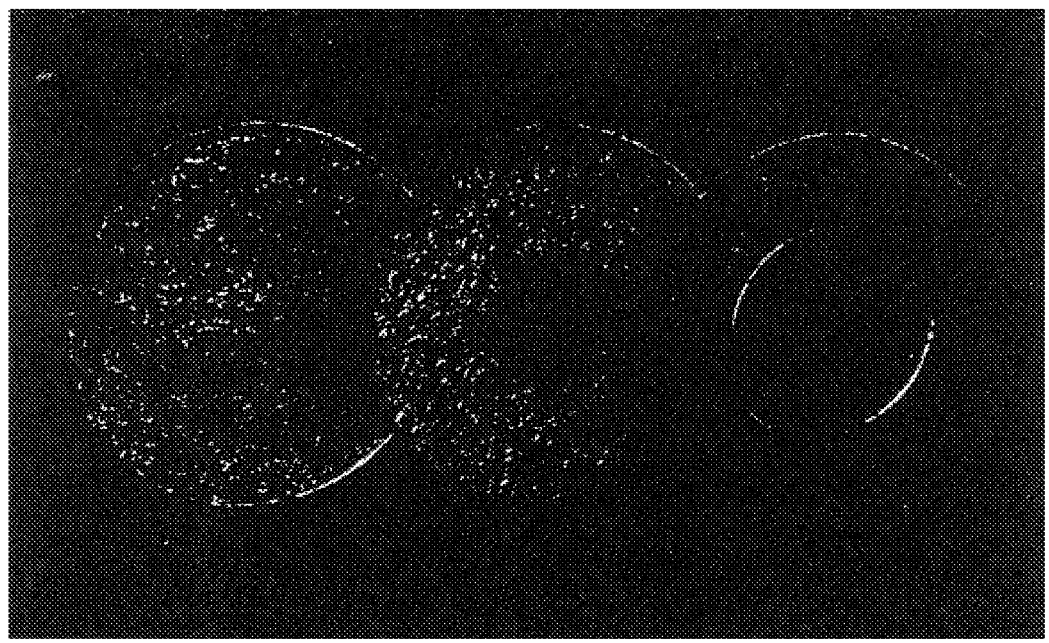
FIG. 1 shows a manufacturing sequence (from left to right) for a pressed green body as CFRC body, a green-machined brake disc and a final-machined brake disc of C/Si-SiC.

FIG. 1 shows a first illustrative embodiment of the production of a brake disc; a dimensionally stable CFRC green body produced by pressing at an elevated temperature of about 150° C. is shown at left, this was subsequently drilled and pyrolysed (centre), after pyrolysis was again machined (picture at right) and only then was infiltrated with an industrial silicon melt.

Figure 2:
FIG. 2 shows an optical photomicrograph of a polished section of the matrix of a composite body after pyrolysis and melt infiltration with liquid silicon at a magnification of 200×.

The microstructure obtained after the melt infiltration can be seen from FIG. 2.

EXAMPLE 1

Carbon fibre bundles having a length of 3 mm and an undefined bundle strength were impregnated with a pitch solution and subsequently dried. This was followed by conditioning by impregnation with a phenolic resin solution and subsequent drying. The fibres which had been coated in this way formed the basis for the production of a pressing composition which was prepared with addition of carbon powder and phenolic resin in a kneader. During kneading, a mixture of TiC and $B_4C$ in powder form having a mean particle size $d_{50}$ of 3 μm and $d_{50}$ of 5.5 μm, respectively, was added continuously. The composition prepared in this way was pressed using a pressing die having a shape close to the final shape in which the composition was cured at a temperature of at least 150° C. to produce dimensionally stable CFRC discs. This was followed by pyrolysis at about 800° C. under protective gas in a pyrolysis furnace.

Any necessary machining to the final shape can be carried out very simply and inexpensively at this stage using conventional methods such as turning (cf. FIG. 1).

After this machining, the material was infiltrated with a liquid silicon melt under reduced pressure at a temperature above the melting point of Si, namely about 1600° C.

The product was subsequently cooled to room temperature.

Figure 3:
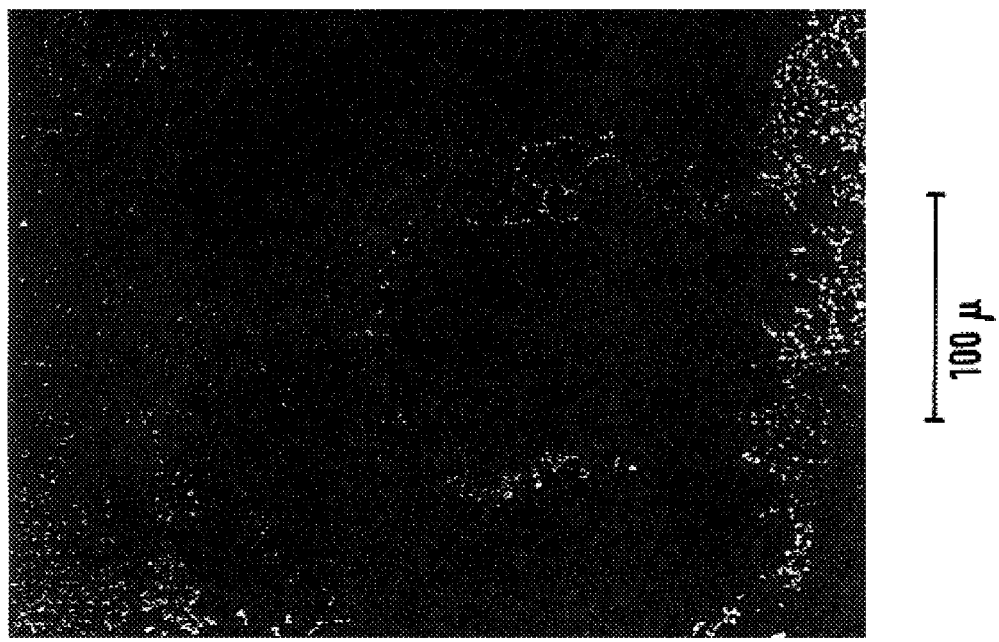
FIG. 3 shows a cross section through fibre bundles after melt infiltration, in which it can be seen that the fibre bundles are virtually completely retained as a result of the double coating

As indicated by the individual carbon fibre bundles visible in the polished section shown in FIG. 3, the carbon fibre bundles are virtually completely retained during the entire production process and are sufficiently protected at their surface against reactive attack by the silicon melt as a result of the double coating with the phenolic resin and the pitch.

Figure 4:
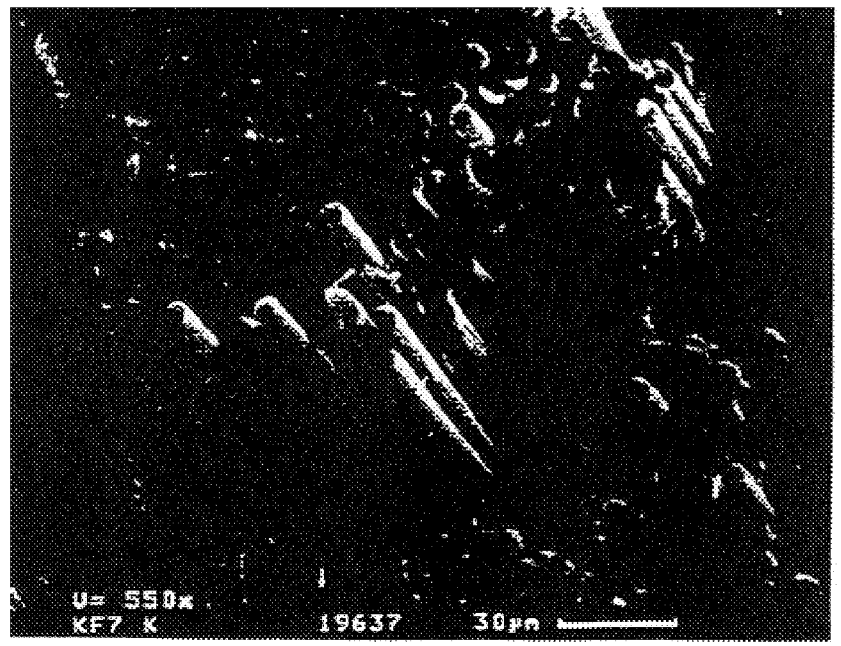
FIG. 4 shows a scanning electron micrograph of a fibre-matrix interface from which it can be seen that the composite body has been made pseudoductile by the fibre pull-out effect.

From the scanning electron micrograph of a fibre-matrix interface shown in FIG. 4, it can be seen that the composite body produced has been made pseudoductile by the fibre pull-out effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for making a fibre-reinforced composite ceramic comprising high-temperature-resistant fibres reaction-bonded to a matrix including silicon, comprising the following:

bundling individual fibers into a fibre bundle;

impregnating the fibre bundle with a first binder suitable for pyrolysis;

drying the impregnated fibre bundle;

preparing of a mixture of the impregnated fibre bundle, a first filler and a second binder;

pressing of the mixture to produce a green body;

pyrolysing the green body under reduced pressure or protective gas to produce a porous fibre-reinforced shaped carbon body; and infiltrating the porous shaped body with a silicon melt.

2. The process of claim 1, wherein the high-temperature-resistant fibers comprise Si—C—B—N.

3. The process of claim 1, wherein the high-temperature-resistant fibers are C fibers or SiC fibers.

4. The process of claim 1, further comprising adding size to the fibres before bundling the individual fibres.

5. The process of claim 3, further comprising adding size to the fibres before bundling the individual fibres.

6. The process of claim 1, further comprising conditioning the fibre bundles with a coating of an antisilicization layer.

7. The process of claim 3, further comprising conditioning the impregnated fibre bundles with a coating of an antisilicization layer.

8. The process of claim 4, further comprising conditioning the impregnated fibre bundles with a coating of an antisilicization layer.

9. The process of claim 1, wherein said first binder forms a solid carbon on pyrolysis.

10. The process of claim 1, wherein said first binder is a pitch.

11. The process of claim 1, wherein the fibre bundles are conditioned with a carbon-rich polymer material as antisilicization layer which forms carbon on pyrolysis.

12. The process of claim 6, wherein the antisilicization layer is a carbon-rich polymer material.

13. The process of claim 6, wherein the antisilicization layer forms silicon carbide on pyrolysis.

14. The process of claim 3, wherein the antisilicization layer is an organosilicon polymer.

15. The process of claim 14, wherein the organosilicon polymer is polycarbosilane.

16. The process of claim 6, wherein the antisilicization layer is a material based on Si—B—C—N which ceramicizes on pyrolysis.

17. The process of claim 16, wherein the antisilicization layer is an organosilicon-boron polymer.

18. The process of claim 17, wherein the organosilicon-boron polymer is polyborosilazane.

19. The process of claim 1, wherein the impregnation is carried out in a mixing or stirring apparatus.

20. The process of claim 1, wherein the fibre bundle includes from about 1000 to 14,000 individual fibres having mean diameters of from about 5 to 10 $\mu$m.

21. The process of claim 1, wherein the fibre bundle has a length of from about 1 to 30 mm.

22. The process of claim 21, wherein the fibre bundle has a length of from about 3 to 16 mm.

23. The process of claim 1, wherein the fibre bundle is from about 20 to 50% by volume of the green body.

24. The process of claim 23, wherein the fibre bundle is from about 30 to 40% by volume of the green body.

25. The process of claim 1, wherein the said first filler is a carbon-containing filler.

26. The process of claim 25, wherein the carbon-containing filler is carbon black or graphite.

27. The process of claim 1, further comprising adding a second filler, said second filler in a form of carbides, nitrides or borides of silicon or refractory metals.

28. The process of claim 27, wherein said second filler is added in powder form to the mixture or at the impregnation.

29. The process of claim 6, further comprising adding a second filler in powder form to the antisilicization coating of the fibre bundle, said second filler in a form of carbides, nitrides or borides of silicon or refractory metals.

30. The process of claim 27, wherein said second filler is silicon carbide, titanium carbide or titanium boride.

31. The process of claim 29, wherein said second filler is silicon carbide, titanium carbide or titanium boride.

32. The process of claim 1, wherein the mixture is prepared in a kneader or mixer.

33. The process of claim 1, wherein the green body is, before or after pyrolysis, machined before the infiltration with a silicon melt is carried out.

34. The process of claim 1, wherein the mixture is adjusted by selection of component materials and their proportions so that the shaped carbon body formed on pyrolysis of the green body has a porosity of from about 20 to 50%.

35. The process of claim 1, wherein said second binder is polyvinyl alcohol or methylcellulose.

36. A melt-infiltrated fibre-reinforced composite ceramic comprising high-temperature-resistant fibres reaction-bonded to a matrix having silicon, wherein randomly distributed short fibre bundles including bundled individual fibre filaments with substantial retention of the individual filaments embedded in the matrix and surrounded, at least in the region of their surface, by a coating of a binder which forms carbon on pyrolysis.

37. The melt-infiltrated fibre-reinforced composite ceramic of claim 36, wherein the high-temperature-resistant fibers are based on Si—C—B—N.

* * * * *